United States Patent Office 3,372,219
Patented Mar. 5, 1968

3,372,219
SYNTHETIC FIBRES BASED UPON POLYVINYL CHLORIDE
Louis Joseph Gord, Ligny-en-Barrois, Meuse, France, assignor to Societe Rhovyl, Paris, France, a French body corporate
No Drawing. Filed Feb. 6, 1964, Ser. No. 343,148
Claims priority, application France, Feb. 12, 1963, 924,506; Jan. 21, 1964, 961,027
5 Claims. (Cl. 264—210)

ABSTRACT OF THE DISCLOSURE

Textile fibres based on polyvinyl chloride, but having a particularly low susceptibility to heat shrinkage, are made by spinning from solution or suspension a mixture of chlorinated polyvinyl chloride having a second order transition temperature of at least 100° C., containing at least 66% by weight of chlorine, and having an AFNOR index T51.013 of at least 100, an acetone-soluble content below 10%, and in the form of fibres consisting wholly of the chlorinated polyvinyl chloride, a stretchability in boiling water below 2 times stretch; with polyvinyl chloride, the proportion of the chlorinated polyvinyl chloride being 5–50% of the weight of the mixture.

---

The present invention relates to filaments, fibres, yarns, and like articles, e.g. bristles, referred to herein generically as fibres, based on polyvinyl chloride.

It is known to produce such fibres by dry spinning or wet spinning solutions of polyvinyl chloride in appropriate solvents. The fibres obtained are interesting in the textile field because of their properties, more especially their chemical inertness, their good light resistance, their non-inflammability and their high thermal, electrical and acoustic insulating power.

It is known that polyvinyl chloride prepared by the most usual processes of polymerisation is a thermoplastic product having a softening point of about 70° C. and that fibres prepared from such a polymer shrink above this temperature, the shrinkage being greater as the temperature to which the fibre is subjected is higher. This shrinkage may reach 40% to 60% in boiling water. Attempts have been made to obviate this disadvantage and to reduce the sensitivity to heat of polyvinyl chloride fibres by subjecting them, after spinning and stretching, to heat setting under tension. After such heat setting the fibres shrink less than before, the shrinkage being smaller the higher the temperature at which the heat setting has been carried out. Unfortunately however, for the fibres prepared from the usual polyvinyl chloride this procedure is not very effective because polyvinyl chloride does not withstand high temperatures.

It is also known that, by using polyvinyl chloride obtained by low-temperature polymerisation processes, fibres may be obtained which, even without a heat setting, shrink less than fibres of the ordinary kind. Moreover, such polymers withstand higher temperatures than ordinary polymers and therefore make it possible to carry out the heat setting at a higher temperature so as to reduce still further the shrinkage effect.

It has been proposed to chlorinate polyvinyl chloride and to use chlorinated polyvinyl chloride to obtain fibres having low heat shrinkage. The chlorinated polyvinyl chloride polymers usable in this way may be obtained by chlorination of a suspension of polyvinyl chloride in the presence of actinic light or at high temperatures, or by any other process by means of which it is possible to obtain a polymer having a second order transition temperature at least equal to 100° C. Unfortunately, these polymers are not well suited for the manufacture of fibres having good textile properties, as they have low mechanical strength and high density.

It has now been found, and this forms the subject of the present invention, that filaments, fibres, yarns and like articles having a reduced tendency to shrink on heating may be made, e.g. by spinning, from a mixture of a chlorinated polyvinyl chloride having a second order transition temperature of at least 100° C. and polyvinyl chloride, the proportion of the chlorinated polyvinyl chloride being at least 5% by weight. With 5% of the chlorinated polymer, there is an appreciable reduction in tendency to shrink, but ordinarily at least 10% but not more than 80% and preferably not more than 50% of the chlorinated polymer is incorporated in the mixture in order that the fibres obtained may have good textile properties. It is surprising that fibres obtained from such mixtures can withstand heat setting temperatures above 100° C. without breaking, so that it is possible still further to reduce their sensitivity to heat. In some cases the heat setting may be combined with a relaxation of up to 20% preferably carried out before the heat setting. Before relaxation and heat setting the fibres will ordinarily have been stretched at 100° to 150° C. to three to six times their original length. In an alternative procedure, discussed in more detail below, after stretching the fibres are retracted in the slack state at or above 100° C. by up to the maximum amount possible.

The fibres of the invention may be obtained by spinning, by the usual methods, solutions of the mixed polymers in solvents or mixtures of solvents such as, for example, carbon disulphide and acetone, perchloroethylene and acetone, tetrahydrofuran, cyclohexanone, benzene and acetone, dimethylformamide, propylene oxide, cyclopentanone and ternary mixtures such as mixtures of carbon tetrachloride, benzene and acetone.

The fibres of the invention may also be obtained by spinning suspensions of the mixed polymers in liquids or mixtures of liquids having a swelling power, but no solvent power, for them, such as for example, trichloroethylene, tetrachloroethane, chloroform, methylene chloride, acetone, benzene, toluene, methyl ethyl ketone, dioxan, ethyl acetate, ethyl-benzene, methyl tetrahydrofuran and xylene.

The spinning operation may be carried out by the usual dry, wet or mixed spinning methods, or by extrusion in the absence of solvent.

After spinning, the fibres are ordinarily stretched to impart thereto an oriented structure. This stretching may be carried out in a gas, a liquid or a vapour, brought to the appropriate temperature. For example, it may be carried out in hot air, in steam, optionally under pressure, or in a non-swelling liquid such as water, oil or glycerine. It may also be carried out by bringing the fibre into contact with a heated surface. The stretching operation may take place either immediately after the spinning operation or in a separate operation. The stretching is generally effected at a temperature equal to or above 100° C., generally at a temperature between 100 and 150° C.

The heat setting under tension of the stretched fibres may itself be carried out in a gas, a liquid or a vapour, or by bringing the fibres into contact with a heated surface. It generally takes place at a temperature above 100° C., the upper limit being set by the heat resistance of the fibre.

As the polyvinyl chloride, there may be used any polyvinyl chloride obtained by bulk, emulsion, solution or suspension polymerisation in the presence of appropriate catalysts at a temperature between —50° and +70° C. The molecular weight of these polymers may vary very widely, and the choice of the polyvinyl chloride to be used may readily be determined by consideration of the desired qualities for the fibres and of the spinning process to be employed. The spinning conditions may themselves be readily determined for each particular mixture by a simple test. The spinning solution may comprise a single polyvinyl chloride and a single chlorinated polyvinyl chloride, or a mixture of chlorinated polyvinyl chlorides having different chlorine contents or different molecular weights in admixture with one or more polyvinyl chlorides of different molecular weights or obtained by different processes of polymerisation.

In addition, the spinning solution or suspension may contain substances intended to modify the mechanical, physical, chemical or dyeing properties of the filaments obtained from it.

Particularly valuable products in accordance with the invention are obtained when the chlorinated polyvinyl chloride used possesses the following characteristics, in addition to a second order transition temperature of at least 100° C.: a chlorine content greater than 66% by weight; an index as determined by AFNOR standard T51.013 of at least 100; a proportion soluble in acetone of less than 10% by weight; and a drawability, as fibres in boiling water, of less than 2.

The solubility in acetone is determined as follows. 300 cc. of acetone and about 5 g. of the polymer (P, weight to the nearest milligram) are placed in a 500 cc. round-bottomed flask provided with a ground glass stopper. The stopper is inserted and the mixture is vigorously shaken by hand to disperse the polymer. The assembly is weighed. The stopper is then replaced by a bulb condenser and the mixture is heated to boiling and kept at a gentle reflux for an hour. It is then allowed to cool, and during this time the polymer settles out. The assembly is again weighed to ensure that no acetone has been lost, and the flask is then placed in a thermostat kept at 20°±0.5° C. Part of the solution is separated and filtered and two 25 cc. samples of this solution are evaporated to dryness in an over at 70° C. to constant weight. If the solid residue weighs $p$ grams, the percentage of the polymer soluble in acetone is given by the formula:

$$\text{Percent soluble} = p \times \frac{300}{25} \times \frac{100}{P} = 1200 \times \frac{p}{P}$$

The drawability of the chlorinated polymer is determined using fibres of the polymer made by dry spinning a solution in a mixture of equal volumes of carbon disulphide and acetone. The fibres obtained are dried for 48 hours at ambient temperature and then drawn in boiling water between two pairs of rollers turning at different speeds, the speed of the second pair of rollers being increased until the fibres are broken. The ratio of the speeds of the two pairs of rollers than represents the degree of drawability.

The chlorinated polyvinyl chlorides preferably used in the invention have a drawability less than 2, and it is surprising that, despite this, they can be mixed with ordinary polyvinyl chloride to produce fibres having a sufficiently high degree of drawability in boiling water. Spun fibres obtained from mixtures of polyvinyl chloride and chlorinated polyvinyl chloride containing 10–30% by weight of the chlorinated polymer can be drawn to more than three times their original length in boiling water. The fibres obtained after such drawing followed by heat setting have a very low tendency to shrink on heating but have good textile qualities and very good mechanical strength.

It has also been found, and this constitutes one of the advantages of the invention, that the mixtures of polyvinyl chloride and chlorinated polyvinyl chloride make possible to use fibres which, after spinning and drawing, have been simply shrunk in the slack state by heating in an appropriate medium, in place of heat setting under tension. It is known that with ordinary polyvinyl chloride fibres, this simplified process leads to fibres possessing a very large elongation of break and that, because of the manipulations to which fibres are ordinarily submitted during spinning (e.g. carding and combing), yarns made starting from shrunk fibres of such ordinary polyvinyl chloride show a considerable tendency to shrink in boiling water, which may be from 5 to 40%, because of the deformations to which they have been subjected. On the other hand, fibres simply shrunk made from mixtures of polymers in accordance with the present invention can be subjected without deformation to the operations of carding and combing; furthermore they may be shrunk at temperatures higher than those used for ordinary polyvinyl chloride fibres. The yarns made from such fibres show no tendency to shrink in boiling water.

The hot shrinking of the fibres produced in accordance with the invention can be carried out in various fluids. Ordinarily, boiling water is used but other fluids, which can be used at elevated temperatures and have no effect on the fibres other than the transfer of heat, can be used. Generally the shrinking is carried out so that the fibre contracts to the maximum extent possible at the temperature of the treatment, but it is also possible to carry out shrinking so that the fibres contract by less than this amount.

It should be pointed out that while ordinary polyvinyl chloride and chlorinated polyvinyl chlorides of the type mentioned above are soluble in such solvents as mixtures of carbon disulphide in acetone, mixtures of acetone and perchloroethylene, and dimethylformamide if mixtures of these solutions are made, the solvents being the same in both cases, cloudy mixtures are obtained. It has nevertheless been established that these cloudy mixtures can be easily spun in conventional apparatus to give the fibres of the invention which have the properties described above.

The polymer mixtures of the invention can also be spun with good results using solvents which are not good solvents for ordinary polyvinyl chloride, e.g. cyclohexanone, or even solvents which only swell the polymers employed, e.g. mixtures of benzene and acetone. It is of course, also possible to use a solvent which gives complete solution of both polymers, e.g. tetrahydrofuran.

The filaments, fibres, yarns and like articles obtained in accordance with the invention may subsequently be finished by any appropriate textile operation, and may be used in weaving or knitting or for the manufacture of unwoven articles, alone or blended with other natural, artificial or synthetic fibres.

The following examples illustrate the invention. The experiments described were carried out with the following polymers:

POLYVINYL CHLORIDE

| Reference | Polymerisation temperature, ° C. | AFNOR index AFNOR standard T51.013 |
|---|---|---|
| P1 | 50–60 | 130 |
| P2 | 30–40 | 130 |
| P3 | 20 | 132 |
| P4 | −10 | 117 |
| P5 | 50–60 | 149 |
| P6 | 25 | 120 |
| P7 | 50–60 | 100 |
| P8 | 50–60 | 300 |
| P9 | 50–60 | 200 |
| P10 | −10 | 130 |
| P11 | −10 | 120 |
| P12 | 50–60 | 84 |
| P13 | 50–60 | 135 |

CHLORINATED POLYVINYL CHLORIDE

| Reference | AFNOR index AFNOR standard T51.013 | Density | Second order transition temperature, ° C. | Cl, percent |
|---|---|---|---|---|
| P′1 | 128 | 1.53 | 110 | 66.5 |
| P′2 | 141 | 1.55 | 120 | 68.2 |
| P′3 | 77 | 1.60 | 125 | 69.1 |
| P′4 | 120 | 1.57 | 122 | 68.5 |

These polymers P′1, P′2, P′3 and P′4 have also the following characteristics: they contain less than 10% of material extractable with acetone; and they cannot be drawn in boiling water to twice their original length.

Example I

A 25% by weight polymer solution containing equal parts of polymers P1 and P'$_1$ is prepared, the solvent being a mixture of equal volumes of carbon disulphide and acetone. This solution is dry spun into a cell at 75° C. (temperature at the spinneret 55° C.) and the fibre obtained was stretched to four times its length in water at 100° C. This fibre has a shrinkage at 28%. If, after stretching, it is subjected to heat setting under tension in air at 130° C. for 6 minutes, its shrinkage in boiling water is only 5%. A fibre prepared under the same conditions, but from polymer P1 alone, has a shrinkage of 55% in boiling water. Even after relaxation and heat setting under tension in hot air at 120° C., which is the maximum temperature which it can withstand, the fibre of vinyl chloride polymer P1 still has a shrinkage of 34%, which is greater than the shrinkage of the untreated fibre of the mixture of polymers P1 and P'$_1$.

Example II

A 25% by weight polymer solution containing 2 parts of polymer P1 to one part of polymer P'$_1$ is prepared, the solvent being a mixture of equal volumes of carbon disulphide and acetone. The fibre prepared by spinning and stretching as in Example I has a shrinkage of 37.7% in boiling water. After heat setting for 6 minutes at 150° C. in air, the shrinkage falls to 4%.

Example III

The same procedure is followed as in the two preceding examples, but 3.5 parts of polymer P1 are employed to each part of polymer P'$_1$. The non-heat set fibre obtained has a shrinkage of 41% in boiling water, and the fibre heat set for 6 minutes in hot air at 150° C. has a shrinkage of only 6%.

Example IV

Fibre is prepared by dry spinning as in Example I, the operating conditions being the following: the polymer mixture contains equal parts of polymers P2 and P'$_2$ as a 25% by weight solution in a mixture of equal volumes of perchloroethylene and acetone; the cell temperature is 130° C. (95° C. at the spinneret); and the fibres are stretched to four times their original length in boiling water. The fibre thus obtained has a shrinkage of 33.8% in boiling water. If, after stretching, it is subjected to a 10% relaxation at 160° C. and then to heat setting under tension at 160° C. for 6 minutes, its shrinkage in boiling water falls to 3%.

Fibres consisting of polymer P2 only and prepared under the same spinning and stretching conditions have substantially the same properties as the fibres of polymer P1 of Example I.

Example V

Fibre is prepared by dry spinning in accordance with the method of Example I, the operating conditions being: the polymer mixture contains 9 parts of polymer P3 to each part of polymer P'$_1$ as a 25% by weight solution in a mixture of equal volumes of benzene and acetone; the cell temperature is 125° C. (90° C. at the spinneret); the fibres are stretched to four times their original length in boiling water; the fibres are then subjected to a 10% relaxation at 145° C. and then to a heat setting under tension at 145° C. for 6 minutes. The fibre obtained has a shrinkage of only 8%.

By comparison, fibre prepared from polymer P3 alone under the same spinning, stretching and relaxation conditions, followed by heat setting at 140° C., has a shrinkage in boiling water of 21%.

Example VI

Fibre is prepared by dry spinning in accordance with the method of Example I, the operating conditions being: the polymer mixture contains 1 part of polymer P4 to one part of polymer P'$_3$ in 3 parts of tetrahydrofuran; the cell temperature is 110° C. (80° C. at the spinneret); the fibres are stretched in glycerine at 120° C., and heat set under tension at 158° C. for one minute. The shrinkage in boiling water is 7.7%.

By comparison fibre prepared from polymer P4 alone under the same spinning and stretching conditions, followed by heat setting at 145° C., has a shrinkage in boiling water of 15%.

Example VII

The method of Example I is followed but with the following conditions: the polymer contains 9 parts of polymer P5 to each part of polymer P'$_3$ as a 25% solution in a mixture of equal volumes of carbon disulphide and acetone; the cell temperature is 75° C. (55° C. at the spinneret); the fibres are stretched to five times their original length in boiling water and heat set under tension at 132° C. for one minute. Fibre whose shrinkage in boiling water is 24.5% is obtained, against 38% in the case of the fibre prepared from polymer P5 alone under the same spinning and stretching conditions, followed by heat setting at 120° C.

Example VIII

The procedure of Example I is followed, using the following conditions: the polymer mixture contained 9 parts of polymer P6 to each part of polymer P'$_3$ as a 25% solution, and the solvent and cell temperature are as in Example I; the fibres were stretched to five times their original length in boiling water. Fibre is obtained whose shrinkage in boiling water is 44.9%. If, after stretching, heat hetting is effected at 138° C. under tension for one minute, the shrinkage in boiling water is only 18.3%.

By comparison, the fibre of polymer P6 alone, prepared under the same spinning and stretching conditions, and heat set at 125° C., has a shrinkage in boiling water of 25%.

Example IX

A mixture of equal parts of polymers P7 and P'$_3$ was malaxated with 3 times its weight of acetone. The mass thus obtained was filtered and then extruded at a temperature of 78° C. under a pressure of 40 kg./cm.$^2$ through a spinneret having 40 holes each of 0.10 mm. in a dry spinning apparatus (cell temperature 130° C.), and the fibre obtained was stretched to four times its original length in boiling water and then heat set under tension at 127° C. for one minute. Its shrinkage in boiling water is 10%.

A fibre of pure polymer P7 obtained under the same spinning and stretching conditions and then subjected to a relaxation treatment and heat set at 105° C. contracts by 36% in boiling water.

Example X

A 12% by weight solution, in dimethylformamide, of a mixture consisting of 4 parts of polymer P8 to one part of polymer P'$_1$ was spun into a coagulating bath consisting of a mixture of water and dimethylformamide in a ratio of 30/70, maintained at a temperature of 55° C. (140° C. at the spinneret). The fibre obtained, after stretching to six times its original length in steam at 110° C., and then relaxed by 5% at 160° C. and set by heating under tension at 160° C. for 5 minutes, has a shrinkage in boiling water of only 2%.

By comparison, a fibre of pure polymer P8 obtained under the same spinning and stretching conditions, followed by relaxation and heat setting at 130° C. under tension, shrinks by 30% in boiling water.

Example XI

A 22% by weight solution, in tetrahydrofuran, of a mixture consisting of 1 part of polymer P9 to 2 parts of polymer P'$_1$ was spun into a coagulating bath consisting of a mixture of water and tetrahydrofuran in a ratio of 80/20, maintained at a temperature of 15° C. (70° C. at the spinneret). The fibre obtained, after stretching to four times its original length in air at 140° C., has a shrinkage of only 3% in boiling water.

A fibre of pure polymer P9 prepared under the same spinning conditions, but set at 126° C., has a shrinkage of 32% in boiling water.

*Example XII*

A 20% by weight solution, in cyclohexanone, of a mixture of 9 parts of polymer P10 to one part of polymer $P'_1$ was spun into a coagulating bath consisting of a mixture of propyl alcohol and water, in a ratio of 73/27, maintained at 40° C. (temperature at the spinneret 120° C.). The fibre thus obtained was stretched to four times its original length at 120° C. in hot air and then heat set under tension at 160° C. for 5 minutes. The shrinkage in boiling water is 4%.

A fibre of pure polymer P10 prepared under the same spinning and stretching conditions and then heat set at 145° C. has a shrinkage of 13% in boiling water.

*Example XIII*

A 20% by weight solution, in cyclohexanone, of a mixture of 3 parts of polymer P9 to 2 parts of polymer P11 and one part of polymer $P'_1$ was spun into a coagulating bath consisting of a mixture of water and isopropyl alcohol in a ratio of 12.7/87.3, maintained at 40° C. (temperature at the spinneret 120° C.). The fibre was thereafter stretched to 3.5 times its original length in stream at 110° C. and then relaxed by 15% at 150° C. and heat set under tension at 150° C. for 5 minutes. The shrinkage in boiling water is then substantially nil.

*Example XIV*

One part of polymer P12 is intimately mixed with one part of polymer $P'_3$. There is added to this mixture a sufficient quantity of stabiliser to enable it to be extruded in an extruding machine without the addition of solvent or plasticiser, and it is then introduced into an extruding machine, the body of which is heated to 155° C. and the head to 130° C., and is forced through a spinneret having holes of 0.2 mm., thus forming monofilaments which are immediately stretched to 3 times their original length. The monofilaments obtained have a shrinkage of 18% in boiling water. By heat setting these monofilaments under tension at 140° C. for 2 minutes, their contraction in boiling water is reduced to substantially nothing.

*Example XV*

A polymer solution containing 29% by weight of solids (based on the total weight of solution) is prepared using a mixture of 20 parts of the polymer $P'_4$ and 80 parts of the polymer P13. The solvent is a mixture of equal volumes of carbon disulphide and acetone. The solution obtained is cloudy, but it is spun dry through a spinneret having 335 holes each 0.07 mm. in diameter. Each filament is of 10 denier and is drawn to four times its original length in boiling water. The stretched filaments have a shrinkage of 25% in boiling water, and divided into two parts.

The first part is heat set under tension for five minutes at 140° C. in hot air. The filaments obtained have the following characteristics: breaking tension, 2.3 g./denier; elongation at break 25%; shrinkage in boiling water less than 5%.

The other part is shrunk in the slack state in boiling water. The filaments obtained have the following characteristics; breaking tension 1.8 g./denier; elongation at break 50%.

These shrunk filaments are then cut into staple fibres, and these fibres are carded and combed, and the tow obtained is spun. Despite the high elongaion at break of the fibres used and despite the carding, combing and spinning operations, the yarn obtained only shrinks to a very small extent in boiling water. Yarns obtained in the same conditions starting from fibres of ordinary polyvinyl chloride, shrunk but not stabilised under tension, shrink a great deal in boiling water because of the deformation of the fibres during the carding and combing operations.

I claim:

1. Process for the production of filaments, fibres, yarns, and like articles based on polyvinyl chloride and of reduced tendency to shrink on heating, which comprises spinning a solution or suspension, in a wholly organic solvent or diluent, of a mixture of chlorinated polyvinyl chloride having a second order transition temperature of at least 100° C., containing at least 66% by weight of chlorine, having an AFNOR index T51.013 of at least 100, an acetone-soluble content below 10%, and, in the form of fibres, a stretchability in boiling water below 2 times stretch, and polyvinyl chloride, the proportion of the chlorinated polyvinyl chloride being 5–50% of the weight of the mixture.

2. Filaments, fibres, yarns, and like articles of reduced tendency to shrink on heating comprising a mixture of chlorinated polyvinyl chloride having a second order transition temperature of at least 100° C., containing more than 66% of chlorine by weight, having an index as determined by AFNOR standard T51.013 of at least 100, a proportion soluble in acetone of less than 10%, and a drawability in the form of fibres in boiling water of less than two, and polyvinyl chloride, the proportion of chlorinated polyvinyl chloride being 5–50% by weight.

3. Process according to claim 1, in which, after spinning, the filaments, fibres, yarns, and like articles are stretched at 100° to 150° C. to three to six times their original length and then heat-set under tension at above 100° C.

4. Process according to claim 4, in which, after stretching, but before heat setting, the filaments, fibres, yarns, and like articles are relaxed by up to 20% of their length.

5. Process according to claim 1 in which, after spinning, the filaments, fibres, yarns, and like articles are stretched at 100° to 150° C. to three to six times their original length and then relaxed in the slack state at least 100° C. by up to the maximum amount possible.

References Cited

UNITED STATES PATENTS

| | | | |
|---|---|---|---|
| 2,996,489 | 8/1961 | Dannis et al. | 260—92.8 |
| 3,067,000 | 12/1962 | Seidel et al. | 264—210 |
| 3,236,825 | 2/1966 | Gord | 264—210 |

FOREIGN PATENTS

| | | |
|---|---|---|
| 459,514 | 1/1937 | Great Britain. |

ALEXANDER H. BRODMERKEL, *Primary Examiner.*

T. MORRIS, *Assistant Examiner.*